Oct. 11, 1938.   J. E. MORTIMORE   2,133,147

COMBINED NOZZLE AND VALVE

Filed Aug. 28, 1937

INVENTOR
James E. Mortimore
BY
C. M. Newman
ATTORNEY

Patented Oct. 11, 1938

2,133,147

UNITED STATES PATENT OFFICE

2,133,147

COMBINED NOZZLE AND VALVE

James E. Mortimore, Stratford, Conn.

Application August 28, 1937, Serial No. 161,400

2 Claims. (Cl. 299—149)

My invention relates to improvements in combined nozzles and valves such as are normally held tightly closed by reason of the fluid pressure thereagainst when connected to a pipe line under pressure. The valve is particularly adapted for use on a flexible pipe line such, for instance, as a hose connected with a compressed air reservoir, and for the supply of air under pressure as in foundry and bench work of various kinds.

The object of my invention is to generally improve upon valves of this type by producing one which will be very much more dependable and sensitive in operation, so that the flow of air can be better regulated and controlled. A further object of the invention is to provide a nozzle the size of the outlet opening of which may be changed better to provide a jet of air of the required quantity for the specific purpose for which the nozzle is to be used. Another object of the invention is to provide a nozzle which can be readily attached to a hose through the use of a suitable coupling, so as to permit it to be moved from place to place in foundry work.

As constructed, the invention is particularly well adapted to hard usage such as is commonly encountered in work of the above class and is accordingly less liable to be damaged or for the valve to be accidentally opened by its being dropped upon the ground or a bench as is the case with valves having exposed trigger or other operating mechanisms upon the surface. While the valve in question has been designed more particularly for air pressure service and foundry and bench usage, yet it will be obvious that it is equally well adapted for other purposes, such for instance as water, steam, etc.

These and other objects of the invention will be more fully understood from the accompanying drawing and pointed out in the specification and claims here to follow.

Figure 1:
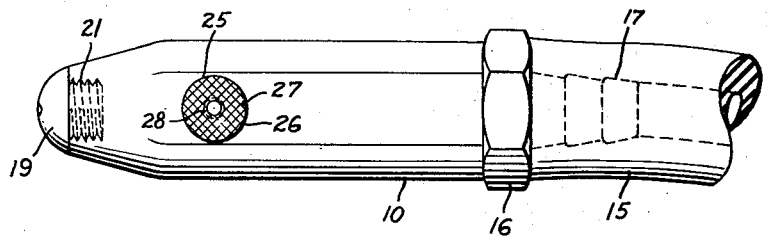
Fig. 1 shows a top plan view of my improved air valve attached to a rubber hose.

Referring in detail to the characters of reference marked upon the several figures of the drawing, similar characters of reference will be found to describe like or corresponding parts and wherein 10 indicates the body of the nozzle which, as will be seen, is of a general elongated hexagonical form having a central opening 11 extended therethrough, the intake end 12 of the opening being slightly larger than the intermediate portion thus forming an annular valve seat 13 within the opening at the intersection of the two said diameters. The outlet end of this opening forming a passage 14 is very much reduced in size from that of the main chamber 11.

The compressed air which the nozzle is designed to control, may be supplied to the nozzle through a hose 15 that is connected to the nozzle through the use of a coupling 16, the nipple end 17 of which receives the end of the hose, whereas the threaded end 18 is screwed into the tapped cylindrical portion of the inlet opening 12. The supply of air is thus admitted to the inlet end of the nozzle through a hose from any suitable source, and passes over the valve seat, when the valve is tilted and escapes through the outlet 14.

The outlet end of the nozzle is provided with a plug 19 having a central opening 20 therethrough to register with the opening 14 in the body 10. A tapped pocket 21 is formed in the outer end of the nozzle to receive the reduced threaded portion of the plug which makes the said plug removable to permit somewhat similar plugs, having a different size hole 20 therethrough, to be substituted and whereby a larger or smaller volume of air may be obtained for different uses.

Figure 2:
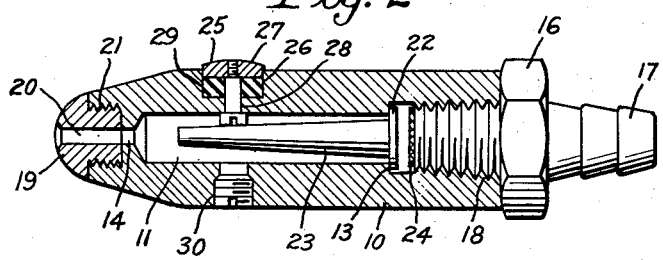
Fig. 2 shows a central vertical longitudinal section taken through the valve and its hose coupling shown in Fig. 1.
Figure 3:
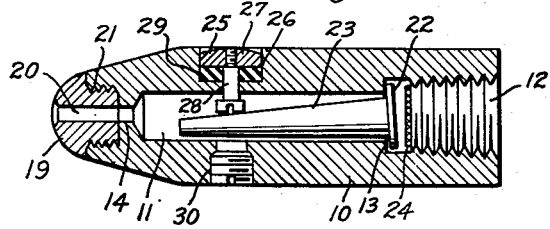
Fig. 3 shows a somewhat similar longitudinal section with coupling omitted and the push button and valve being shown in an operated position.
Figure 4:
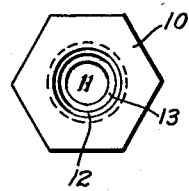
Fig. 4 is an end view as seen from the right of Fig. 3.
Figure 5:
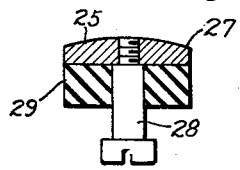
Fig. 5 is an enlarged detached view of the push button assembly shown in Figs. 2 and 3.
Figure 6:
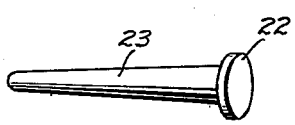
Fig. 6 is the detached perspective view of the valve and stem shown in Figs. 2 and 3.
Figure 7:
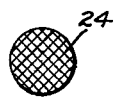
Fig. 7 is a top plan view of a fine screen disk employed in the intake end of the nozzle adjacent the head of the valve.
Figure 8:
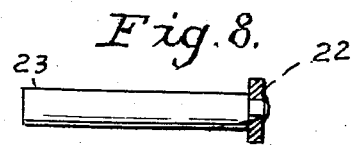
Fig. 8 shows a side view of a modified form of valve.

The valve head 22 is relatively flat and normally rests upon the annular shoulder 13 in the opening 12. The extended shank portion 23 of this valve may be slightly tapered as seen in Figs. 2, 3 and 6, or like that shown in Fig. 8, and normally extends centrally and longitudinally in the opening 11 in spaced relation to the side wall of the opening, it obviously being normally held in this position by reason of the air pressure against the outer face of the head. A very fine gauge disc 24 is positioned in the opening 12 adjacent the outer face of the head so as to better protect the valve seat from particles of dirt which might be brought in through the air line.

The valve is opened by deflecting its stem, see Fig. 3, through the medium of a push button 25 that is seated in a socket 26 of the body and comprises a thumb piece 27 that normally projects slightly above the outer periphery of the body and is adapted to be pressed in to operate the valve. The button is provided with a shank 28 that extends into the base 11 and is preferably formed with a screw, having a head within the passage, that normally rests upon the periphery of the shank of the valve so that any inward pressure upon the button will deflect the valve stem in a way to raise the head of the valve from its seat and allow the air to pass through. In order to form an air tight and dust proof connection of the push button with the body I provide a soft rubber washer 29 upon the shank of the push button and between the head of the button and the bottom of the socket so as to prevent dust from getting in and interfering with the operation of the button. A screw plugged hole 30 has been provided directly opposite the screw 28 better to permit the assembly of the button by first placing the screw through the rubber washer and then into the button proper.

To operate the valve to open the same, the button is compressed in the manner suggested and when released, the air pressure against the side of the head will naturally seat the valve and again push its stem central within the longitudinal opening 11 and in close contact to the head of the screw 28.

Having thus described my invention what I claim and desire to secure by Letters Patent is:

1. A combined valve and nozzle comprising an elongated rigid body having a central longitudinal passage therethrough including a relatively large air intake end, a valve chamber and an elongated intermediate chamber portion of a reduced diameter, there being an annular valve seat formed at the junction of the diameter of the valve chamber and the elongated intermediate passage, a normally closed pressure-seated valve within the passage having a tiltable head adapted to normally cover the valve seat and having a stem normally disposed central of and longitudinally in the intermediate passage, a pocket in the side of the body, a push button positioned in the pocket and having a stem extended through the wall of the body at a right angle for engagement with the valve stem to tilt the same against the action of the air pressure, the said push button being adapted to be pressed inward to deflect the valve stem against air-pressure in a manner to tip the head of the valve upon its seat to form a passage therebeneath.

2. A combined valve and nozzle comprising an elongated rigid body having a central longitudinal passage therethrough including a relatively large threaded air-intake, a valve chamber and an elongated intermediate chamber of a reduced diameter, there being an annular valve seat formed at the junction of the diameter of the valve chamber and the elongated intermediate passage, a hose coupling positioned in the intake, a normally closed pressure-seated valve within the passage having an integral head adapted to normally cover the valve seat and having a tapered stem smallest at its free end normally disposed central of and longitudinally in the intermediate passage, a pocket in the side of the body, a push button positioned in the pocket and having a stem extended through the wall of the body at a right angle for engagement with the valve stem, a yieldable washer surrounding the stem and positioned between the bottom of the button and the base of the pocket to seal the same against air-pressure, the said push button being adapted to be pressed inward to deflect the valve stem against air pressure in a manner to tip the head of the valve upon its seat.

JAMES E. MORTIMORE.